(12) United States Patent
Kim et al.

(10) Patent No.: US 10,094,573 B2
(45) Date of Patent: Oct. 9, 2018

(54) LINER, FLOW SLEEVE AND GAS TURBINE COMBUSTOR EACH HAVING COOLING SLEEVE

(71) Applicant: DOOSAN HEAVY INDUSTRIES & CONSTRUCTION CO., LTD., Gyeongsangnam-do (KR)

(72) Inventors: Young Bong Kim, Chungcheongbuk-do (KR); Jinhoon Choe, Daejeon (KR); Ujin Roh, Daejeon (KR)

(73) Assignee: DOOSAN Heavy Industries Construction Co., LTD, Gyeongsangnam-do (KR)

( * ) Notice: Subject to any disclaimer, the term of this patent is extended or adjusted under 35 U.S.C. 154(b) by 668 days.

(21) Appl. No.: 14/590,747

(22) Filed: Jan. 6, 2015

(65) Prior Publication Data
US 2015/0198335 A1    Jul. 16, 2015

(30) Foreign Application Priority Data

Jan. 16, 2014  (KR) ........................ 10-2014-0005741

(51) Int. Cl.
*F23R 3/54*    (2006.01)
*F02C 7/18*    (2006.01)
(Continued)

(52) U.S. Cl.
CPC .................. *F23R 3/54* (2013.01); *F02C 7/18* (2013.01); *F23R 3/002* (2013.01); *F23R 3/02* (2013.01);
(Continued)

(58) Field of Classification Search
CPC .... F23R 3/54; F23R 3/004; F23R 3/14; F23R 3/16; F23R 3/002; F23R 3/02;
(Continued)

(56) References Cited

U.S. PATENT DOCUMENTS 2,447,482 A * 8/1948 Arnold .................... F23R 3/007
110/336
3,307,354 A * 3/1967 MacAulay ................ F23R 3/08
60/757

(Continued)

FOREIGN PATENT DOCUMENTS

CN    103216848 A    7/2013
EP    1130321 A1     9/2001
(Continued)

OTHER PUBLICATIONS

Chinese Office Action dated Jun. 29, 2016 in corresponding Chinese patent application 201410642017.7.
(Continued)

*Primary Examiner* — Jason Newton
(74) *Attorney, Agent, or Firm* — Invenstone Patent, LLC (57) ABSTRACT

A gas turbine combustor includes a liner and a transmission piece. Fuel injected in the liner from a fuel nozzle of a gas turbine mixes with compressed air. High temperature gas produced in the liner is transmitted through the transmission piece. The liner is disposed in a flow sleeve in which cooling holes are formed. The transition piece is disposed in a perforated sleeve. Compressed air supplied through holes formed in the perforated sleeve collides with the transition piece. The liner includes a cooling sleeve disposed thereon that divides the air supplied through the cooling holes of the flow sleeve and the compressed air flowing to a space portion between the liner and the flow sleeve.

17 Claims, 4 Drawing Sheets

(51) Int. Cl.
*F23R 3/00* (2006.01)
*F23R 3/02* (2006.01)

(52) U.S. Cl.
CPC ............... *F23R 2900/03043* (2013.01); *F23R 2900/03044* (2013.01); *F23R 2900/03045* (2013.01)

(58) Field of Classification Search
CPC .. F23R 2900/03045; F23R 2900/03043; F23R 2900/03044; F02C 7/18
USPC ........................................................ 60/755
See application file for complete search history.

(56) References Cited

U.S. PATENT DOCUMENTS

| | | | | |
|---|---|---|---|---|
| 3,349,558 A * | 10/1967 | Smith | ............... | F23R 3/002 416/231 R |
| 3,793,827 A * | 2/1974 | Ekstedt | ............... | F23R 3/08 60/757 |
| 3,826,082 A * | 7/1974 | Smuland | ............... | F23R 3/08 60/757 |
| 3,910,039 A * | 10/1975 | Fortini | ............... | F02K 9/64 239/127.3 |
| 4,195,474 A * | 4/1980 | Bintz | ............... | F01D 9/023 165/169 |
| 4,236,378 A * | 12/1980 | Vogt | ............... | F23R 3/002 60/748 |
| 4,622,821 A * | 11/1986 | Madden | ............... | F23R 3/06 60/755 |
| 4,790,140 A * | 12/1988 | Sato | ............... | F23R 3/002 60/757 |
| 4,872,312 A * | 10/1989 | Iizuka | ............... | F01D 9/023 60/754 |
| 5,329,773 A * | 7/1994 | Myers | ............... | F23R 3/002 60/757 |
| 5,361,828 A * | 11/1994 | Lee | ............... | F01D 5/187 165/109.1 |
| 5,363,654 A * | 11/1994 | Lee | ............... | F23R 3/002 165/908 |
| 5,467,815 A * | 11/1995 | Haumann | ............... | F01P 1/02 165/109.1 |
| 5,802,841 A * | 9/1998 | Maeda | ............... | F23R 3/005 60/39.182 |
| 6,018,950 A * | 2/2000 | Moeller | ............... | F01D 9/023 29/889.2 |
| 6,134,877 A * | 10/2000 | Alkabie | ............... | F23R 3/002 60/748 |
| 6,173,561 B1 * | 1/2001 | Sato | ............... | F02C 7/18 60/752 |
| 6,484,505 B1 * | 11/2002 | Brown | ............... | F23R 3/002 60/760 |
| 6,494,044 B1 * | 12/2002 | Bland | ............... | F01D 9/023 60/757 |
| 6,681,578 B1 * | 1/2004 | Bunker | ............... | F23R 3/005 60/759 |
| 6,925,808 B2 * | 8/2005 | Tiemann | ............... | F23M 7/04 60/722 |
| 7,137,241 B2 * | 11/2006 | Martling | ............... | F01D 9/023 60/39.37 |
| 7,219,498 B2 * | 5/2007 | Hadder | ............... | F23R 3/007 60/752 |
| 7,310,938 B2 * | 12/2007 | Marcum | ............... | F01D 9/023 60/39.37 |
| 7,373,778 B2 * | 5/2008 | Bunker | ............... | F01D 25/12 431/351 |
| 7,386,980 B2 * | 6/2008 | Green | ............... | F23R 3/005 60/752 |
| 7,757,492 B2 * | 7/2010 | Intile | ............... | F01D 9/023 60/752 |
| 8,033,119 B2 * | 10/2011 | Liang | ............... | F01D 9/023 60/752 |
| 8,166,764 B2 * | 5/2012 | Chokshi | ............... | F01D 5/186 60/758 |
| 8,646,276 B2 * | 2/2014 | Davis, Jr. | ............... | F23R 3/005 60/752 |
| 9,440,743 B2 * | 9/2016 | Mansfield-Marcoux | ............... | F16L 41/023 |
| 2010/0170259 A1 * | 7/2010 | Huffman | ............... | F01D 9/023 60/755 |
| 2010/0205972 A1 * | 8/2010 | Chila | ............... | F23R 3/002 60/752 |
| 2010/0316492 A1 * | 12/2010 | Charron | ............... | F01D 9/023 415/182.1 |
| 2011/0107766 A1 | 5/2011 | Davis, Jr. | | |
| 2011/0110761 A1 * | 5/2011 | Haehnle | ............... | F01D 9/023 415/115 |
| 2011/0203282 A1 * | 8/2011 | Charron | ............... | F01D 9/023 60/722 |
| 2011/0232299 A1 * | 9/2011 | Stryapunin | ............... | F23R 3/04 60/806 |
| 2012/0006504 A1 | 1/2012 | Sugiura | | |
| 2012/0055165 A1 * | 3/2012 | Roldan-Posada | ............... | F01D 9/023 60/755 |
| 2012/0121408 A1 * | 5/2012 | Lee | ............... | F01D 9/023 415/214.1 |
| 2013/0180252 A1 * | 7/2013 | Chen | ............... | F23R 3/002 60/754 |
| 2015/0101336 A1 * | 4/2015 | Numata | ............... | F23R 3/44 60/755 |
| 2015/0292744 A1 * | 10/2015 | Ziminsky | ............... | F23R 3/42 60/772 |
| 2016/0061452 A1 * | 3/2016 | Walker | ............... | F23R 3/286 60/737 |
| 2016/0069566 A1 * | 3/2016 | Numata | ............... | F23R 3/002 60/752 |
| 2016/0209034 A1 * | 7/2016 | Maurer | ............... | B23K 1/0004 |
| 2017/0138596 A1 * | 5/2017 | Freeman | ............... | F23R 3/002 |

FOREIGN PATENT DOCUMENTS

| | | |
|---|---|---|
| EP | 1 983 266 A2 | 10/2008 |
| EP | 2 618 056 A1 | 7/2013 |
| JP | 06-213444 A | 8/1994 |
| JP | 2000-320837 A | 11/2000 |
| KR | 10-2000-0072387 A | 11/2001 |
| KR | 2002-0027056 A | 4/2002 |
| WO | 9857044 A1 | 12/1998 |

OTHER PUBLICATIONS

Korean Office Action dated Mar. 18, 2015 in corresponding Korean Patent Application No. 10-2014-0005741.

European Search Report dated May 20, 2015 in corresponding European Patent Application No. 15151315.7-1605.

European Office Action dated May 28, 2018 in corresponding European Patent Application No. 15151315.7.

* cited by examiner

LINER, FLOW SLEEVE AND GAS TURBINE COMBUSTOR EACH HAVING COOLING SLEEVE

CROSS-REFERENCE TO RELATED APPLICATIONS

This application claims priority to Korean Application No. 10-2014-0005741, filed Jan. 16, 2014, the contents of which are incorporated herein in their entirety.

BACKGROUND

The present disclosure relates to a liner for a gas turbine combustor, a flow sleeve for a gas turbine combustor, and a gas turbine combustor, and more particularly, to a liner, a flow sleeve and a gas turbine combustor each having a cooling sleeve.

A turbine is a mechanical device that extracts an impulsive or repulsive force from a flow of a compressed fluid like gas and converts it into a rotary force. If steam is used as the fluid, it is called a steam turbine, and if combustion gas is used as the fluid, it is called a gas turbine.

The thermal cycle of the gas turbine is the Brayton cycle, and the gas turbine is composed of three main components, that is, a compressor, a combustor, and a turbine. According to the operating principle of the gas turbine, air is first absorbed in the atmosphere and compressed by way of the compressor, the compressed air is sent to the combustor and produced as high temperature, high pressure gas operating the turbine, and finally, exhaust gas is emitted to the atmosphere. Accordingly, the thermal cycle of the gas turbine includes four processes, that is, compression, heating, expansion and heat radiation.

The compressor of the gas turbine absorbs air from the atmosphere and supplies the air for combustion to the combustor, and in this case, the pressure and the air temperature in the compressor are increased through adiabatic compression.

The combustor mixes the compressed air supplied from the compressor with fuel and burns the mixture to produce combustion gas having high energy, and through an isobaric combustion process, the temperature of the combustion gas is raised up to a temperature limit of the combustor and the turbine.

The high temperature, high pressure combustion gas produced from the combustor is expanded in the turbine, and the expanded gas gives an impulsive or repulsive force to the rotary blades of the turbine, thus converting it into mechanical energy. The mechanical energy made in the turbine is supplied as energy to compress air to the compressor, and the remainder is used to drive an electric generator, thus producing power.

Since the main components of the gas turbine have no reciprocal motions like a piston and a cylinder, there are no frictional portions between them, so that advantageously, an amount of lubricating oil is extremely small, the amount generally used in the reciprocating motion mechanism are substantially reduced, and high speed motions are taken.

The present disclosure relates to the combustor of the gas turbine as mentioned above.

Figure 1:
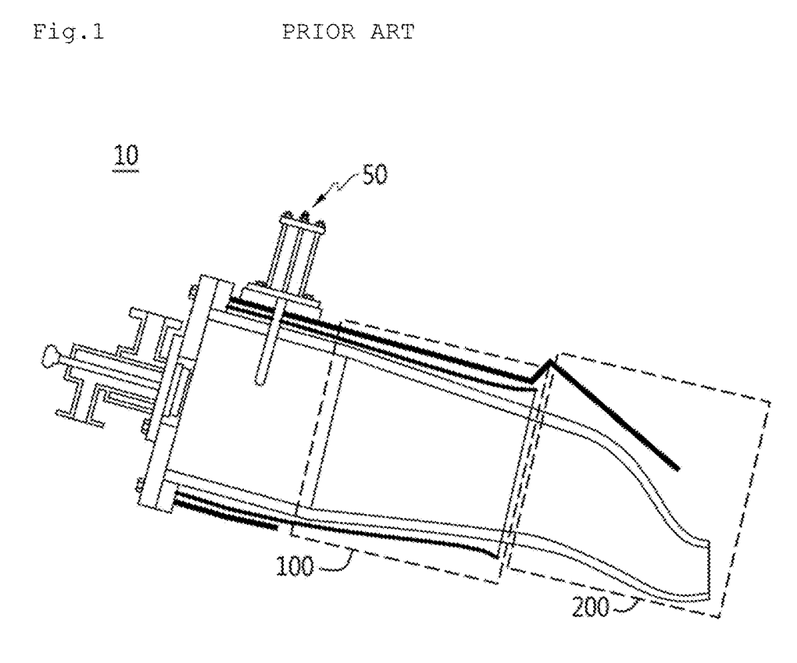
FIG. 1 is a schematic sectional view showing a gas turbine combustor.

FIG. 1 is a schematic sectional view showing a gas turbine combustor. As shown in FIG. 1, a combustor 10 of the gas turbine largely includes an ignition part 50, a liner part 100 and a transition piece part 200.

The ignition part 50 serves to ignite fuel, and the liner 100 is an energy generation part that mixes the fuel with compressed air and converts high temperature gas into motion energy to drive a turbine. The transition piece part 200 is connected to the liner part 100 and sends the high temperature gas, while increasing the velocity of the gas.

Since the combustion occurs in the liner part 100, the temperature of the liner part 100 becomes increased, and accordingly, cooling the liner part 100 is very important in effective operation of the turbine.

Figure 2:
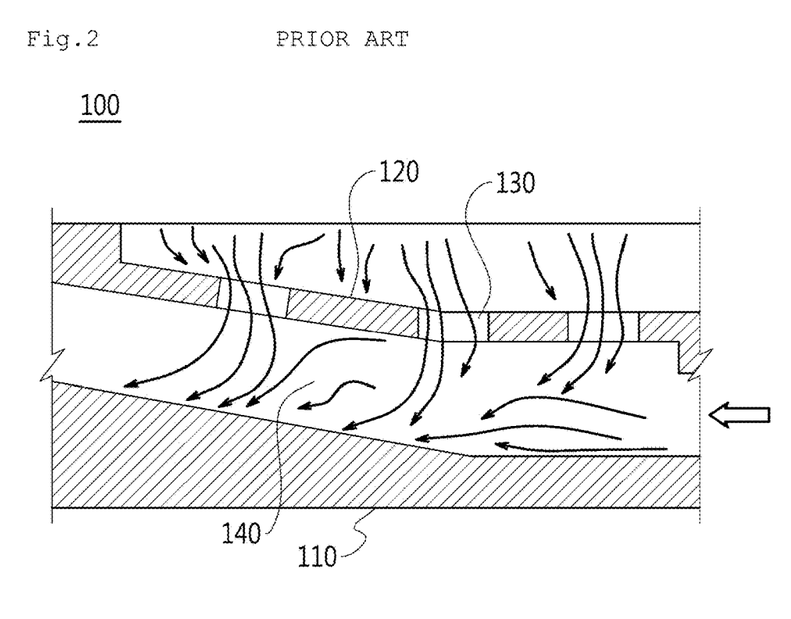
FIG. 2 is a side sectional view showing a liner part in the gas turbine combustor.

FIG. 2 is a side sectional view showing the liner part 100 in the gas turbine combustor. As shown in FIG. 2, the way of cooling a liner 110 in the liner part 100 can be checked. The liner part 100 includes the liner 110 and a flow sleeve 120 adapted to encompass the liner 110. The flow sleeve 120 has cooling holes 130 formed therein to allow air (hereinafter, referred to as jet flows) introduced through the cooling holes 130 to vertically collide against the liner 110, thus cooling the liner 110.

However, as the liner part 100 is connected to the transition piece part 200, the collision cooling becomes under the influence of air (hereinafter, referred to as cross flows) introduced from the transition piece part 200 into a space portion 140 between the liner 110 and the flow sleeve 120 of the liner part 100.

Figure 3:
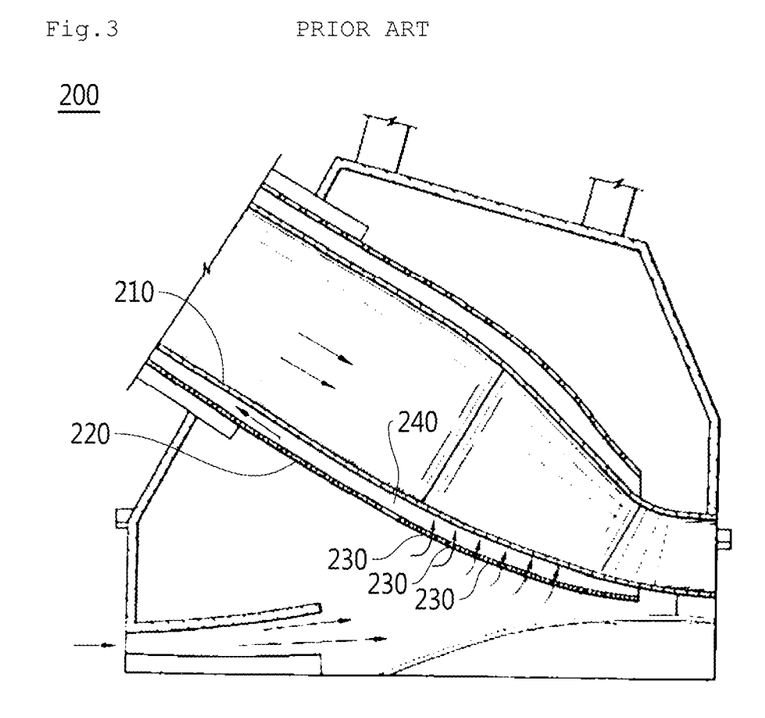
FIG. 3 is a side sectional view showing a transition piece in the gas turbine combustor.

FIG. 3 is a side sectional view showing the transition piece part 200 in the gas turbine combustor. As shown in FIG. 3, a perforated sleeve 220 is adapted to encompass a transition piece 210, and through the cooling of the perforated sleeve 220, the air to be emitted to the compressor moves and collides against the transition piece 210, thus cooling the transition piece 210. After that, the cooled air moves along an annular pipe in a space portion 240 between the transition piece 210 and the perforated sleeve 220 and then moves along another annular pipe in the space portion between the liner 110 and the flow sleeve 120. Accordingly, the cooled air vertically collides against the jet flows moving toward the surface of the liner 110 of the combustor 10 from the cooling holes 130 of the flow sleeve 120. The formation of such cross flows reduces the cooling effect in the region of the liner 110 against which the heat of the jet flows passing through the flow sleeve 120 collides. That is, a substantially low heat transfer rate occurs on the surface of the liner 110. Such low heat transfer rate causes a high temperature on the surface of the liner 110, which results in the loss of strength. Accordingly, the life span of the liner 110 becomes shortened, which undesirably needs frequent exchanging.

BRIEF SUMMARY

Accordingly, the present disclosure has been made in view of the above-mentioned problems, and it is an object of the present disclosure to provide a liner, a flow sleeve and a gas turbine combustor each having a cooling sleeve, thus increasing cooling performance through collision cooling, while reducing or avoiding loss of pressure.

It is another object of the present disclosure to provide a liner, a flow sleeve and a gas turbine combustor each having a cooling sleeve, thus enhancing collision cooling performance, mixing cooling performance according to flows, cooling performance of the liner, and durability of the gas turbine combustor and reducing the maintenance cost of the gas turbine combustor.

According to a first aspect of the present disclosure, there is provided a liner for a gas turbine combustor, the gas turbine combustor having the liner in which fuel injected from a fuel nozzle of a gas turbine mixes with compressed air and is burned and a transition piece through which the high temperature gas produced in the liner is transmitted, while increasing the transmission speed of the gas. The liner is encompassed by a flow sleeve in which cooling holes are formed and cooled by way of the air supplied through the cooling holes. The transition piece is encompassed by a perforated sleeve and compressed air supplied through holes formed on the perforated sleeve collides against the transition piece to allow the colliding air to flow to a space portion between the liner and the flow sleeve. The liner includes a cooling sleeve mounted thereon to divide the air supplied through the cooling holes of the flow sleeve and the compressed air flowing to the space portion between the liner and the flow sleeve after colliding against the transition piece.

According to the present disclosure, desirably, the cooling sleeve includes convex portions and concave portions, and the compressed air flowing to the space portion between the liner and the flow sleeve after colliding against the transition piece moves between the concave portions.

According to the present disclosure, desirably, the convex portions of the cooling sleeve serve as guides for the air supplied through the cooling holes of the flow sleeve and are located in a direction parallel to the cooling holes, and each concave portion of the cooling sleeve is located adjacent to each convex portion.

According to the present disclosure, desirably, the convex portions of the cooling sleeve become increased in height as the convex portions go from the transition piece toward the liner.

According to the present disclosure, desirably, if the cooling holes of the flow sleeve are arranged in a plurality of rows in the longitudinal direction of the liner, the cooling sleeve is located up to the first cooling hole row in a direction from the transition piece toward the liner.

According to a second aspect of the present disclosure, there is provided a flow sleeve for a gas turbine combustor, the gas turbine combustor having a liner in which fuel injected from a fuel nozzle of a gas turbine mixes with compressed air and is burned and a transition piece through which the high temperature gas produced in the liner is transmitted, while increasing the transmission speed of the gas. The liner is encompassed by the flow sleeve in which cooling holes are formed and cooled by way of the air supplied through the cooling holes. The transition piece is encompassed by a perforated sleeve and compressed air supplied through holes formed on the perforated sleeve collides with the transition piece to allow the colliding air to flow to a space portion between the liner and the flow sleeve. The flow sleeve includes a cooling sleeve mounted thereon to divide the air supplied through the cooling holes of the flow sleeve and the compressed air flowing to the space portion between the liner and the flow sleeve after colliding against the transition piece.

According to the present disclosure, desirably, the cooling sleeve includes convex portions and concave portions, and the compressed air flowing to the space portion between the liner and the flow sleeve after colliding against the transition piece moves between the concave portions.

According to the present disclosure, desirably, the convex portions of the cooling sleeve serve as guides for the air supplied through the cooling holes of the flow sleeve and are located in a direction parallel to the cooling holes, and each concave portion of the cooling sleeve is located adjacent to each convex portion.

According to the present disclosure, desirably, the convex portions of the cooling sleeve become increased in height as the convex portions go from the transition piece toward the liner.

According to the present disclosure, desirably, if the cooling holes of the flow sleeve are arranged in a plurality of rows in the longitudinal direction of the liner, the cooling sleeve is located up to the first cooling hole row in a direction from the transition piece toward the liner.

According to a third aspect of the present disclosure, there is provided a gas turbine combustor including a liner, a transition piece and a cooling sleeve. In the liner fuel injected from a fuel nozzle of a gas turbine mixes with compressed air and is burned. The liner is encompassed by a flow sleeve in which cooling holes are formed and cooled by way of the air supplied through the cooling holes. High temperature gas produced in the liner is transmitted through the transition piece while increasing the speed of the gas transmitted therefrom. The transition piece is encompassed by a perforated sleeve and compressed air supplied through holes formed on the perforated sleeve collide against the transition piece to allow the colliding air to flow to a space portion between the liner and the flow sleeve. The cooling sleeve is mounted between the flow sleeve and the liner to divide the air supplied through the cooling holes of the flow sleeve and the compressed air flowing to the space portion between the liner and the flow sleeve after colliding against the transition piece.

According to the present disclosure, desirably, the cooling sleeve includes convex portions and concave portions, and the compressed air flowing to the space portion between the liner and the flow sleeve after colliding against the transition piece moves between the concave portions.

According to the present disclosure, desirably, the convex portions of the cooling sleeve serve as guides for the air supplied through the cooling holes of the flow sleeve and are located in a direction parallel to the cooling holes, and each concave portion of the cooling sleeve is located adjacent to each convex portion.

According to the present disclosure, desirably, the convex portions of the cooling sleeve become increased in height as the convex portions go from the transition piece toward the liner.

According to the present disclosure, desirably, if the cooling holes of the flow sleeve are arranged in a plurality of rows in the longitudinal direction of the liner, the cooling sleeve is located up to the first cooling hole row in a direction from the transition piece toward the liner.

According to the present disclosure, desirably, the cooling sleeve is located on the flow sleeve.

According to the present disclosure, desirably, the cooling sleeve is located on the liner.

BRIEF DESCRIPTION OF THE DRAWINGS

The above and other objects, features and advantages of the present disclosure will be apparent from the following detailed description of the preferred embodiments in conjunction with the accompanying drawings, in which.

DETAILED DESCRIPTION

Hereinafter, an explanation on a liner, a flow sleeve and a gas turbine combustor each having a cooling sleeve according to the present disclosure will be given in detail with reference to the attached drawing. While this disclosure is illustrated and described in preferred embodiments, the device may be produced in many different configurations, forms, and characteristics. Those skilled in the art will envision many other possible variations within the scope of the present disclosure. In the description, similar reference numerals in the drawings have the same or similar functions as each other or to each other, and the thicknesses of the lines or the sizes of the components shown in the drawing may be magnified for the clarity and convenience of the description.

Figure 5:
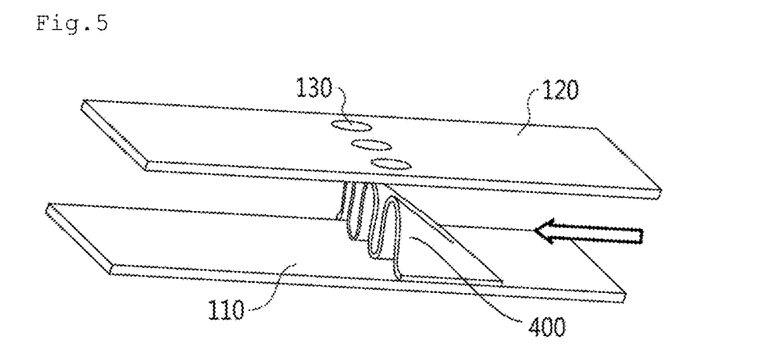
FIG. 5 is a perspective view showing a liner having the cooling sleeve according to a first embodiment of the present disclosure.
Figure 6:
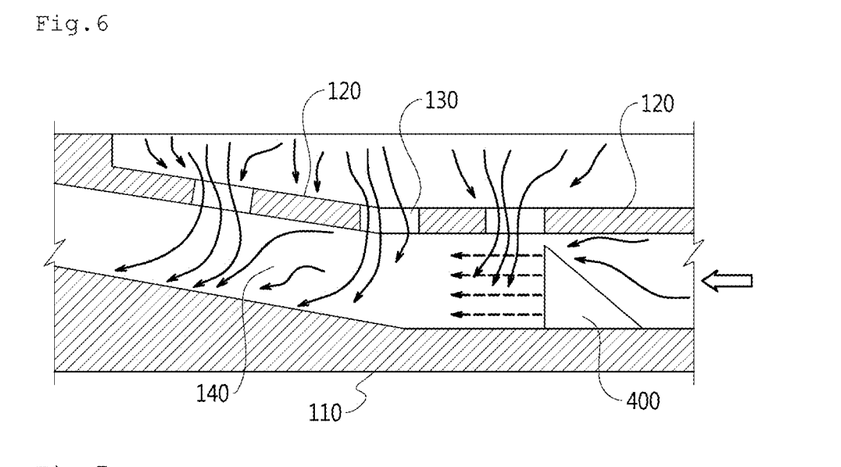
FIG. 6 is a side sectional view showing the liner having the cooling sleeve according to the first embodiment of the present disclosure.

FIG. 5 is a perspective view showing a liner having a cooling sleeve according to a first embodiment of the present disclosure, and FIG. 6 is a side sectional view showing the liner having the cooling sleeve according to the first embodiment of the present disclosure.

Referring to FIGS. 5 and 6, there is provided a liner 110 for a gas turbine combustor according to a first embodiment of the present disclosure. In the gas turbine combustor, fuel is injected from a fuel nozzle, mixes with compressed air, and is burned. The gas turbine combustor includes a transition piece 210 through which high temperature gas produced in the liner 110 is transmitted while increasing the transmission speed of the gas. The liner 110 is disposed in (in some cases being encompassed by) a flow sleeve 120 in which cooling holes 130 are formed. The liner 110 is cooled by way of the air supplied through the cooling holes 130. The transition piece 210 is disposed in (in some cases being encompassed by) a perforated sleeve 220 and compressed air supplied through holes formed on the perforated sleeve 220 collides against the transition piece 210 to allow the colliding air to flow to a space portion 140 between the liner 110 and the flow sleeve 120. The liner 110 includes a cooling sleeve 400 mounted thereon to divide the air supplied through the cooling holes 130 of the flow sleeve 120 and the compressed air flowing to the space portion 140 after colliding against the transition piece 210.

As mentioned above, that is, the characteristics of the present disclosure are focused on the cooling sleeve 400 which may address problems such as the reduction of cooling efficiency due to the collision between jet flows and cross flows, the interference of flows caused by the existence of cooling dimples, and the increment of the pressure loss caused thereby.

Figure 4:
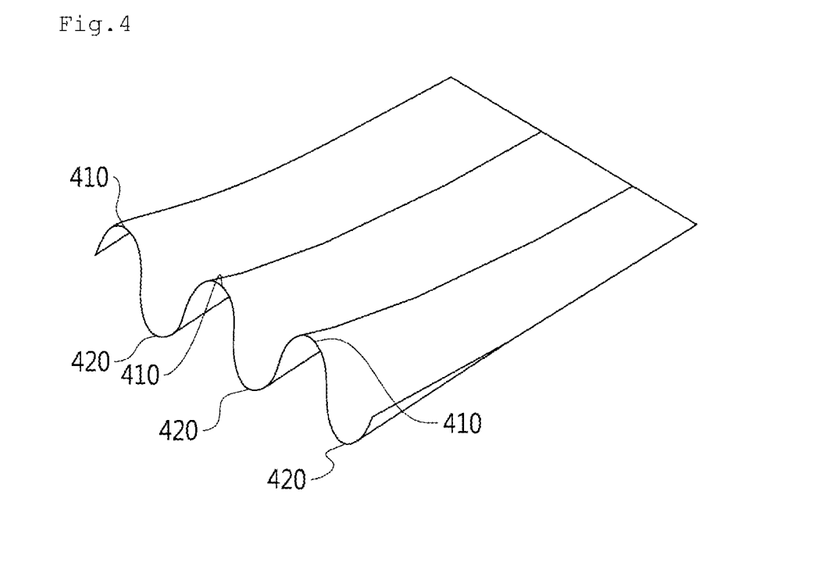
FIG. 4 is a perspective view showing a cooling sleeve.

FIG. 4 is a perspective view showing the cooling sleeve 400 applied to the present invention. As shown, the cooling sleeve 400 includes convex portions 410 and concave portions 420 arranged alternately with each other.

The convex portions 410 of the cooling sleeve 400 serve as guides for the air supplied through the cooling holes 130 of the flow sleeve 120 to allow the jet flows to vertically collide against the liner 110. The concave portions 420 of the cooling sleeve 400, which are formed at adjacent positions to the convex portions 410, serve as moving passages for the cross flows moving to the space portion 140 between the liner 110 and the flow sleeve 120 after colliding against the transition piece 210.

That is, while the function of cooling dimples are being performed by way of the convex portions 410, the cross flows move through the concave portions 420, so that interference in flows and increased pressure loss may be avoided.

Further, the convex portions 410 of the cooling sleeve 400 may increased in height as they go from the transition piece 210 toward the liner 110, which allows the cross flows to move between the concave portions 420, while avoiding interference from other flows.

The cooling holes 130 of the flow sleeve 120 may be arranged in a plurality of rows in the longitudinal direction of the liner 110, and the cooling sleeve 400 may be located up to the first cooling hole row in a direction from the transition piece 210 toward the liner 110. Preferably, the cooling sleeve 400 is not located over the second cooling row to avoid the cooling sleeve 400 from stopping the collision of the jet flows against the liner 110.

Furthermore, the cross flows moving along the concave portions 420 generate vortexes in front of the cooling sleeve 400 according to momentum differences. The vortexes may increase the mixture of the flows, thus improving the cooling performance.

The cooling sleeve 400 as shown in FIG. 4 has a shape of a wave, but other shapes may also be used. As mentioned above, the cooling sleeve 400 preferably serves as the guide for the jet flows passing through the cooling holes 130 and the moving passages for the cross flows supplied from the transition piece 210. The cooling sleeve 400 may have a number of shapes such as the shape of a polygon like a triangle, square or others. Regardless of the shape, the convex portions 410 and the convex portions 420 may alternate with each other.

As shown in FIGS. 5 and 6, the cooling sleeve 400 is coupled to the liner 110 according to the first embodiment of the present disclosure, which is different from the liner of FIG. 2. In FIG. 2, no specific part is coupled to the liner 110. Thus, the liners of FIG. 2 and the first embodiment of the present disclosure are different.

Referring to FIGS. 5 and 6, the cooling principle of the liner 110 according to the first embodiment of the present disclosure will be explained. First, the liner part 100 of the gas turbine combustor includes the liner 110 and the flow sleeve 120 adapted to encompass the liner 110. The flow sleeve 120 has the cooling holes 130 formed therein so that the jet flows supplied through the cooling holes 130 vertically collide against the liner 110 cooling the liner 110.

According to the first embodiment of the present disclosure, the cooling sleeve 400 is mounted on the liner 110 to allow the cross flows moving from the transition piece part 200 to the space portion 140 to flow to the concave portions 420 thereof and to allow the jet flows to be guided by the convex portions 410. The jet flows may thereby avoid the influence of the cross flows, which effectively cools the liner 110. The pressure of the cross flows may not decrease from direct collision against the convex portions 410, and the cross flows may move along the concave portions 420 and generate vortexes in front of the cooling sleeve 400 that increase the mixture of the flows. Thus, cooling performance of the liner 110 may be improved.

Figure 7:
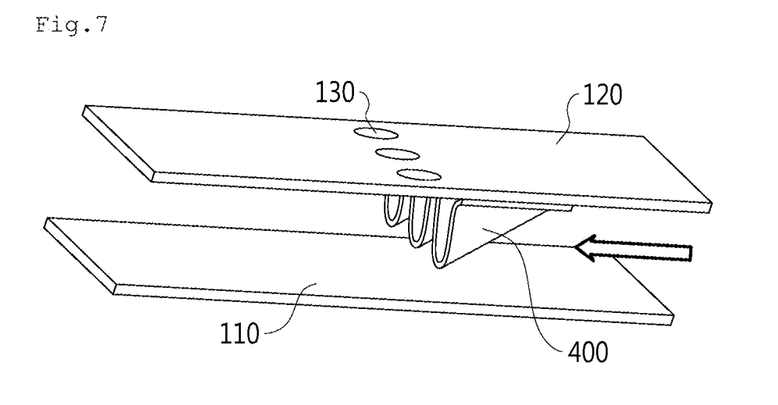
FIG. 7 is a perspective view showing a flow sleeve having the cooling sleeve according to a second embodiment of the present disclosure.
Figure 8:
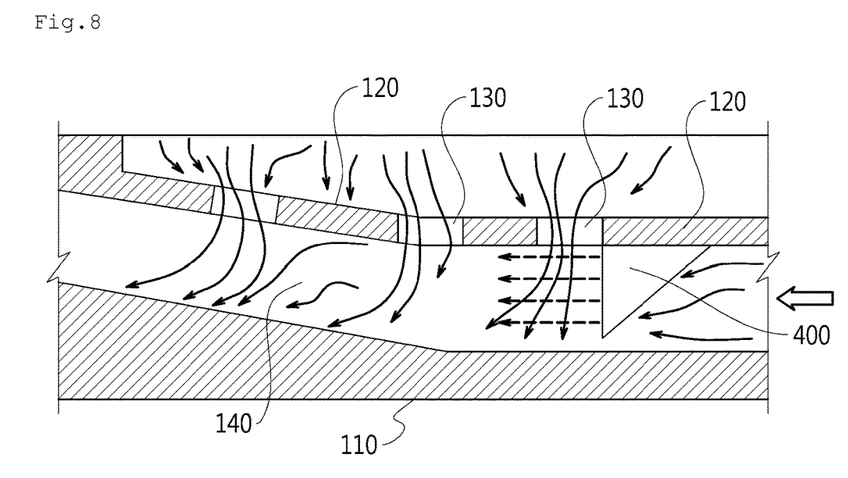
FIG. 8 is a side sectional view showing the flow sleeve having the cooling sleeve according to the second embodiment of the present disclosure.

FIG. 7 is a perspective view showing a flow sleeve having the cooling sleeve according to a second embodiment of the present disclosure, and FIG. 8 is a side sectional view showing the flow sleeve having the cooling sleeve according to the second embodiment of the present disclosure.

Referring to FIGS. 7 and 8, there is provided a flow sleeve 120 for a gas turbine combustor according to a second embodiment of the present disclosure. In the gas turbine combustor, fuel is injected from a fuel nozzle, mixes with compressed air, and is burned. and the gas turbine combustor includes a transition piece 210 through which the high temperature gas produced in the liner 110 is transmitted while increasing the transmission speed of the gas. The liner 110 is disposed in (in some cases being encompassed by) the flow sleeve 120 in which cooling holes 130 are formed. The liner 110 is and cooled by way of the air supplied through the cooling holes 130. Transition piece 210 is disposed in (in some cases being encompassed by) a perforated sleeve 220 and compressed air supplied through holes formed on the perforated sleeve 220 collides against the transition piece 210 to allow the colliding air to flow to a space portion 140 between the liner 110 and the flow sleeve 120. The flow sleeve 120 includes a cooling sleeve 400 mounted thereon to divide the air supplied through the cooling holes 130 of the flow sleeve 120 and the compressed air flowing to the space portion 140 after colliding against the transition piece 210.

That is, according to the first embodiment of the present disclosure, the cooling sleeve 400 is coupled to the liner 110, but according to the second embodiment of the present disclosure, the cooling sleeve 400 is coupled to the flow sleeve 120.

The cooling sleeve 400 coupled to the flow sleeve 120 is the same as that coupled to the liner 110 as mentioned above, except that the positions of convex portions 410 and concave portions 420 are different from each other. In the case of the cooling sleeve 400 coupled to the liner 110, the concave portions 420 are located toward the liner 110 and the convex portions 410 are located toward the flow sleeve 120. In the case of the cooling sleeve 400 coupled to the flow sleeve 120, the concave portions 420 are located toward the flow sleeve 120 and the convex portions 410 are located toward the liner 110.

As shown in FIGS. 7 and 8, the cooling sleeve 400 is coupled to the flow sleeve 120 according to the second embodiment of the present disclosure, which is different from the liner of FIG. 2. In FIG. 2, no specific part is coupled to the flow sleeve 120. Thus, the liners of FIG. 2 and the second embodiment of the present disclosure are different.

Referring to FIGS. 7 and 8, the cooling principle of the liner 110 according to the second embodiment of the present disclosure will be explained. First, the liner part 100 of the gas turbine combustor includes the liner 110 and the flow sleeve 120 adapted to encompass the liner 110. The flow sleeve 120 has the cooling holes 130 formed therein so that the jet flows supplied through the cooling holes 130 vertically collide against the liner 110 cooling the liner 110.

According to the second embodiment of the present disclosure, the cooling sleeve 400 is mounted on the flow sleeve 120 to allow the cross flows moving from the transition piece part 200 to the space portion 140 to flow to the concave portions 420 thereof and to allow the jet flows to be guided by the convex portions 410. The jet flows may thereby avoid the influence of the cross flows, which effectively cools the liner 110. The pressure of the cross flows may not decrease from direct collision against the convex portions 410, and the cross flows may move along the concave portions 420 and generate vortexes in front of the cooling sleeve 400 that increase the mixture of the flows. Thus, cooling performance of the liner 110 may be improved.

A difference between the first and second embodiments of the present disclosure is whether the cooling sleeve 400 is coupled to the liner 110 or the flow sleeve 120.

Whether the cooling sleeve 400 is coupled to the liner 110 or the flow sleeve 120, the jet flows move similarly. Since the cross flows move along the concave portions 420 formed between the gradually inclined surfaces of the cooling sleeve 400, they flow near the liner 110 when the cooling sleeve 400 is coupled to the liner 110, and they flow near the flow sleeve 120 when the cooling sleeve 400 is coupled to the flow sleeve 120. In the case where a cooling sleeve 400 is coupled to the liner 110 and a cooling sleeve 400 coupled is also coupled to the flow sleeve 120, the cross flows generate vortexes after passing through the cooling sleeve 400, thus increasing the cooling effect.

According to a third embodiment of the present disclosure, a gas turbine combustor has a liner 110 in which fuel injected from a fuel nozzle of a gas turbine mixes with compressed air and is burned. The gas turbine combustor includes a transition piece 210 through which the high temperature gas produced in the liner 110 is transmitted while increasing the transmission speed of the gas. The liner 110 is disposed in (in some cases being encompassed by) a flow sleeve 120 in which cooling holes 130 are formed. The liner 140 is cooled by way of the air supplied through the cooling holes 130. The transition piece 210 is disposed in (in some cases being encompassed by) a perforated sleeve 220 and compressed air supplied through holes formed on the perforated sleeve 220 collides against the transition piece 210 to allow the colliding air to flow to a space portion 140 between the liner 110 and the flow sleeve 120. The gas turbine combustor includes a cooling sleeve 400 mounted thereon to divide the air supplied through the cooling holes 130 of the flow sleeve 120 and the compressed air flowing to the space portion 140 after colliding against the transition piece 210.

According to the third embodiment of the present disclosure, the gas turbine combustor has the cooling sleeve 400, like the liner 110 according to the first embodiment of the present disclosure and the flow sleeve 120 according to the second embodiment of the present disclosure. The components such as the flow sleeve 120 and the liner 110 constituting the combustor have been described above in the first and second embodiments of the present disclosure, and a gas turbine combustor having the flow sleeve 120 and the liner 110 is described in the third embodiment of the present disclosure.

Accordingly, the operating principle of the gas turbine combustor according to the third embodiment of the present disclosure is the same as that according to the first and second embodiments of the present disclosure, and it may include the flow sleeve 120 coupled to the cooling sleeve 400, the liner 110 coupled to the cooling sleeve 400, or both. Of course, the gas turbine combustor according to the third embodiment of the present disclosure has the same effects as according to the first and second embodiments of the present disclosure.

As described above, each of the liner, the flow sleeve and the gas turbine combustor according to the first to third embodiments of the present disclosure has a cooling sleeve, thus increasing cooling performance through collision cooling, while avoiding loss of pressure.

Moreover, each of the liner, the flow sleeve and the gas turbine combustor according to the first to third embodiments of the present disclosure has the cooling sleeve, wherein the convex portions of the cooling sleeve serve as the guide for the compressed air vertically colliding against the liner, thus enhancing collision cooling performance. The compressed air supplied from the transition piece moves along the concave portions of the cooling sleeve, thus improving mixing cooling performance while avoiding interference with the vertically colliding compressed air by way of the cooling holes. Cooling performance of the liner and the durability of the gas turbine combustor are improved, thus reducing the maintenance cost of the gas turbine combustor.

While the present invention has been described with reference to the particular illustrative embodiments, it is not to be restricted by the embodiments. It is to be appreciated that those skilled in the art can change or modify the embodiments without departing from the scope and spirit of the present invention.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A liner for a gas turbine combustor, the gas turbine combustor having a flow sleeve disposed around the liner and a transition piece, the liner comprising:
 a cooling sleeve disposed on the liner operable to divide air supplied through cooling holes defined in the flow sleeve and compressed air flowing to a space portion defined between the liner and the flow sleeve, the compressed air having collided against the transition piece.

2. The liner according to claim 1, wherein the cooling sleeve comprises convex portions and concave portions, and the concave portions are operable to direct the compressed air flowing to the space portion.

3. The liner according to claim 2, wherein
 the convex portions are operable to guide the air supplied through the cooling holes of the flow sleeve,
 the convex portions are disposed in a direction parallel to the cooling holes, and
 each concave portion is adjacent to at least one of the convex portions.

4. The liner according to claim 2, wherein a height of the convex portions increases from the transition piece toward the liner.

5. The liner according to claim 1, wherein
 the cooling holes are arranged in a plurality of rows in a longitudinal direction of the liner, and
 the cooling sleeve extends up to a first cooling hole row in a direction from the transition piece toward the liner.

6. A flow sleeve for a gas turbine combustor, the gas turbine combustor having a liner disposed in the flow sleeve and a transition piece, the flow sleeve comprising:
 a cooling sleeve disposed on the flow sleeve operable to divide air supplied through cooling holes defined in the flow sleeve and compressed air flowing to a space portion defined between the liner and the flow sleeve, the compressed air having collided against the transition piece.

7. The flow sleeve according to claim 6, wherein the cooling sleeve comprises convex portions and concave portions, and the concave portions are operable to direct the compressed air flowing to the space portion.

8. The flow sleeve according to claim 7, wherein
 the convex portions are operable to guide the air supplied through the cooling holes of the flow sleeve,
 the convex portions are disposed in a direction parallel to the cooling holes, and
 each concave portion is adjacent to at least one of the convex portions.

9. The flow sleeve according to claim 7, wherein a height of the convex portions increases from the transition piece toward the liner.

10. The flow sleeve according to claim 6, wherein
 the cooling holes are arranged in a plurality of rows in a longitudinal direction of the liner, and
 the cooling sleeve extends up to a first cooling hole row in a direction from the transition piece toward the liner.

11. A gas turbine combustor comprising:
 a liner operable to receive fuel injected from a fuel nozzle of a gas turbine that mixes with compressed air and is burned;
 a flow sleeve disposed around the liner, the flow sleeve having cooling holes defined therein operable to cool the liner when air is supplied through the cooling holes;
 a transition piece operable to transmit and increase transmission speed of gas produced in the liner;
 a perforated sleeve disposed around the transition piece, the transition piece having holes defined therein operable to supply compressed air that collides against the transition piece and flows to a space portion defined between the liner and the flow sleeve; and
 a cooling sleeve disposed between the flow sleeve and the liner operable to divide air supplied through the cooling holes of the flow sleeve and compressed air flowing to the space portion, the compressed air having collided against the transition piece.

12. The gas turbine combustor according to claim 11, wherein the cooling sleeve comprises convex portions and concave portions, and the concave portions are operable to direct the compressed air flowing to the space portion.

13. The gas turbine combustor according to claim 12, wherein
 the convex portions are operable to guide the air supplied through the cooling holes of the flow sleeve, the convex portions are disposed in a direction parallel to the cooling holes, and each concave portion is adjacent to at least one of the convex portions.

14. The gas turbine combustor according to claim 12, wherein a height of the convex portions increases from the transition piece toward the liner.

15. The gas turbine combustor according to claim 11, wherein the cooling holes are arranged in a plurality of rows in a longitudinal direction of the liner, and the cooling sleeve extends up to a first cooling hole row in a direction from the transition piece toward the liner.

16. The gas turbine combustor according to claim 12, wherein the cooling sleeve is coupled to the flow sleeve.

17. The gas turbine combustor according to claim 12, wherein the cooling sleeve is coupled to the liner.

\* \* \* \* \*